United States Patent [19]

Banjo et al.

[11] Patent Number: 4,924,077

[45] Date of Patent: May 8, 1990

[54] MEMORY CARD

[75] Inventors: Toshinobu Banjo; Yasuhiro Murasawa; Shigeo Onoda, all of Itami, Japan

[73] Assignee: Mitsubishi Denki Kabushiki Kaisha, Japan

[21] Appl. No.: 154,319

[22] Filed: Feb. 10, 1988

[30] Foreign Application Priority Data

Mar. 31, 1987 [JP] Japan .................................. 62-79919

[51] Int. Cl.$^5$ ............................................ G06K 19/06
[52] U.S. Cl. .................................... 235/492; 235/441; 439/140
[58] Field of Search ....................... 235/492, 488, 441; 439/136, 139, 140, 141

[56] References Cited

U.S. PATENT DOCUMENTS

| 3,865,456 | 2/1975 | Dola | 439/137 |
| 4,600,257 | 7/1986 | Fushimoto | 235/492 X |
| 4,695,925 | 9/1987 | Kodai et al. | 235/492 X |
| 4,767,348 | 8/1988 | Murakami | 439/140 |
| 4,780,604 | 10/1988 | Hasegawa et al. | 235/492 |
| 4,789,347 | 12/1988 | Banjo et al. | 439/140 |
| 4,791,608 | 12/1988 | Fushimoto | 439/137 X |

FOREIGN PATENT DOCUMENTS 59-127284  7/1984  Japan .

Primary Examiner—David L. Trafton
Attorney, Agent, or Firm—Leydig, Voit & Mayer

[57] ABSTRACT

A memory card having: a card-like package; a semiconductor module disposed within the package; a plurality of electrode terminals mounted on the package for external electrical connection of the semiconductor module in the package to an external circuit; a metallic shutter disposed on the package and movable between an open position in which the electrode terminals are exposed for the electrical connection and a closed position in which the electrode terminals are covered; and an insulating layer formed on a surface of the shutter which faces the electrodes.

5 Claims, 1 Drawing Sheet

FIG. 1 PRIOR ART
FIG. 2 PRIOR ART
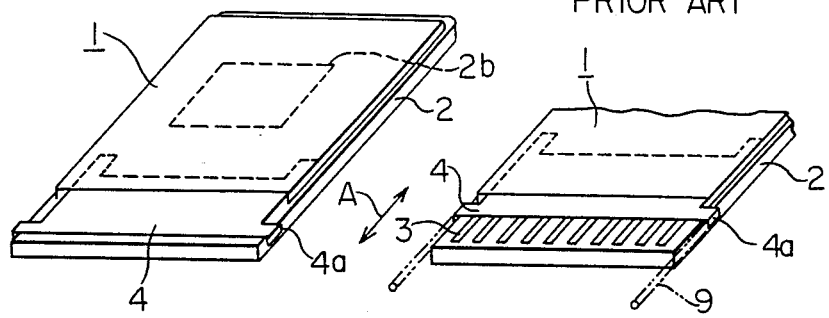
FIG. 3 PRIOR ART
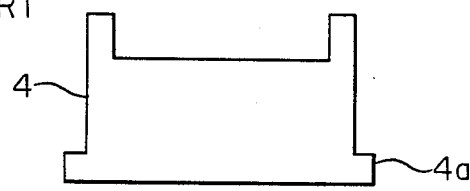
FIG. 4
FIG. 5
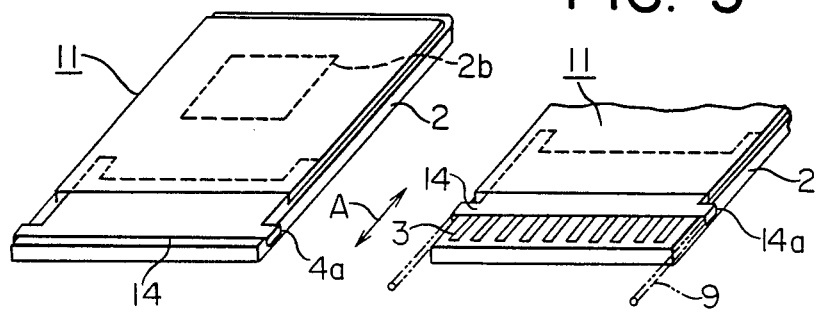
FIG. 6
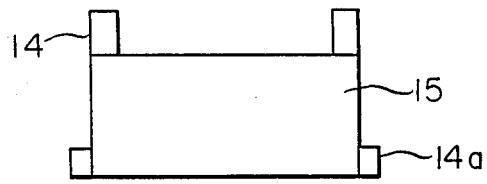

MEMORY CARD

BACKGROUND OF THE INVENTION

This invention relates to a memory card such as an IC card for use in a game machine and, more particularly, to a shutter for covering electrode terminals of the card.

The type of memory card that is used as an IC card which contains TV game software or as a desk card for use in a microcomputer system has a structure such as that shown in FIG. 1. A memory card 1 (hereinafter simply referred to as "card") has a multiplicity of electrode terminals 3 (refer to FIG. 2) disposed on the obverse surface of a package 2 at one end thereof. The package 2 accommodates a semiconductor module 2b in which thin semiconductor modules, electronic parts, a thin cell battery such as a mercury cell, and so forth are incorporated. A shutter 4 is formed from a thin metallic plate and adapted to cover the electrode terminals 3. The shutter 4 is supported in such a manner that it can open or close by sliding in the longitudinal direction of the card as indicated by the arrow A. The shutter 4 has a pair of downwardly bent projections 4a formed at its extreme ends. FIG. 3 shows the reverse side of the shutter 4. In order to reduce the thickness of the card 1 as much as possible, the shutter 4 is formed from a thin plate made of a metallic material such as stainless steel and is thereby improved in mechanical strength.

A return spring (not shown) is stretched between the shutter 4 and the package 2, and functions to close the shutter in a normal state.

To use the thus constructed card 1, the card is inserted into a connector disposed on the side of a card reader (both not shown), the projections 4a of the shutter 4 abut against the receiving pins disposed on the side of the connector, and the shutter 4 is thereby opened, as shown in FIG. 2. This exposes the electrode terminals 3 of the card 1 and bring them into contact with electrode-contacting pieces (not shown) of the connector, thereby electrically connecting the card to the card reader.

In this type of conventional memory card, a gap which is formed between the metal shutter 4 and the electrode terminals 3 is small, and there is a possibility of static electrical charge on the shutter being discharged to the electrode terminals 3 or a possibility of the shutter contacting the electrode terminals 3 and causing a short-circuit therebetween.

SUMMARY OF THE INVENTION

This invention has been achieved with a view to overcoming this problem, and an object of the present invention is to provide a memory card capable of preventing discharge of static electricity from the shutter to the electrode terminals and preventing the occurrence of short-circuits between the electrode terminals.

To this end, the present invention provides a memory card having a metal shutter whose inside surface is coated with an insulating layer. This arrangement makes it possible to prevent short-circuits between the electrode terminals and discharge of static electricity to the electrode terminals.

BRIEF DESCRIPTION OF THE DRAWINGS

FIG. 1 is a schematic perspective view of a conventional memory card, illustrating a state in which the shutter is closed;

FIG. 2 is a schematic perspective view of essential portions of the conventional memory card, illustrating a state in which the shutter is open;

FIG. 3 is a bottom view of the shutter shown in FIGS. 1 and 2;

FIG. 4 is a schematic perspective view of a memory card which represents an embodiment of the present invention, illustrating a state in which the shutter is closed;

FIG. 5 is a schematic perspective view of portions of the memory card shown in FIG. 4, illustrating a state in which the shutter is open; and FIG. 6 is a bottom view of the shutter shown in FIGS. 4 and 5.

DESCRIPTION OF THE PREFERRED EMBODIMENT

FIG. 4 shows a memory card which represents an embodiment of the present invention. Components 2 and 3 (refer to FIG. 5) are the same as those of the above-described conventional device and, therefore, the description of them will not be repeated. A card 11 is provided with a shutter 14 which is different from the above-described type of shutter. The shutter 14 is formed from a thin metallic plate made of stainless steel or the like, has downwardly bent projections 14a formed at its extreme ends, and is opened and closed in the same manner as the conventional device.

FIG. 6 shows the reverse surface of the shutter 14. As shown in FIG. 6, an insulating layer 15 is formed on the reverse surface of the shutter 14 by applying thereover an insulating synthetic resin such as a polyimide resin, silicone resin, epoxy resin, and so forth.

If the thus constructed card is inserted into a connector disposed on the side of a card reader (both not shown), the projections 14a of the shutter 14 are received by shutter receiving pins 9 disposed on the connector so that the shutter 14 is opened, thereby enabling the electrode terminals 3 to be brought into contact with electrode-contacting pieces (not shown) of the connector.

In accordance with the present invention, as described above, an insulation layer is formed on the reverse surface of the shutter that is formed from a thin metallic plate, thereby preventing any static electricity from discharging to the electrode terminals while the mechanical strength of the shutter is maintained without substantially increasing the thickness thereof.

What is claimed is:

1. A memory card comprising:
    a card-shaped package;
    a semiconductor module disposed within said package;
    a plurality of electrode terminals mounted on said package for external electrical connection of said semiconductor module in said package to an external circuit;
    a metallic shutter disposed on said package and movable between an open position in which said electrode terminals are exposed for said electrical connection and a closed position in which said electrode terminals are covered; and
    an insulating layer formed on a surface of said shutter facing said electrode terminals.

2. A memory card as claimed in claim 1, wherein said insulating layer is formed by applying an insulating synthetic resin.

3. A memory card as claimed in claim 2, wherein said insulating synthetic resin is a polyimide resin.

4. A memory card as claimed in claim 2, wherein said insulating synthetic resin is a silicone resin.

5. A memory card as claimed in claim 2, wherein said insulating resin is an epoxy resin.

* * * * *